United States Patent Office 3,359,837
Patented Dec. 26, 1967

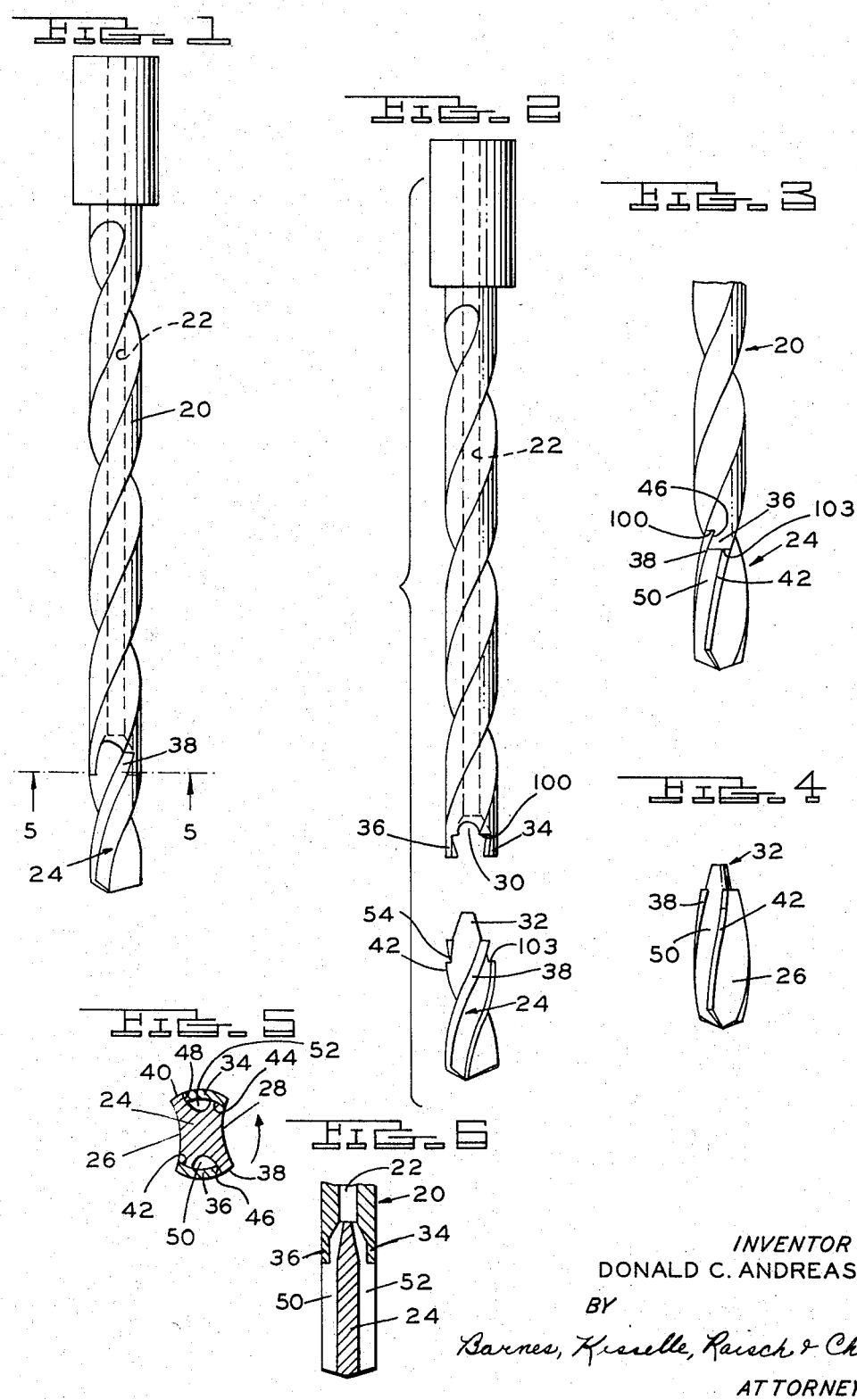

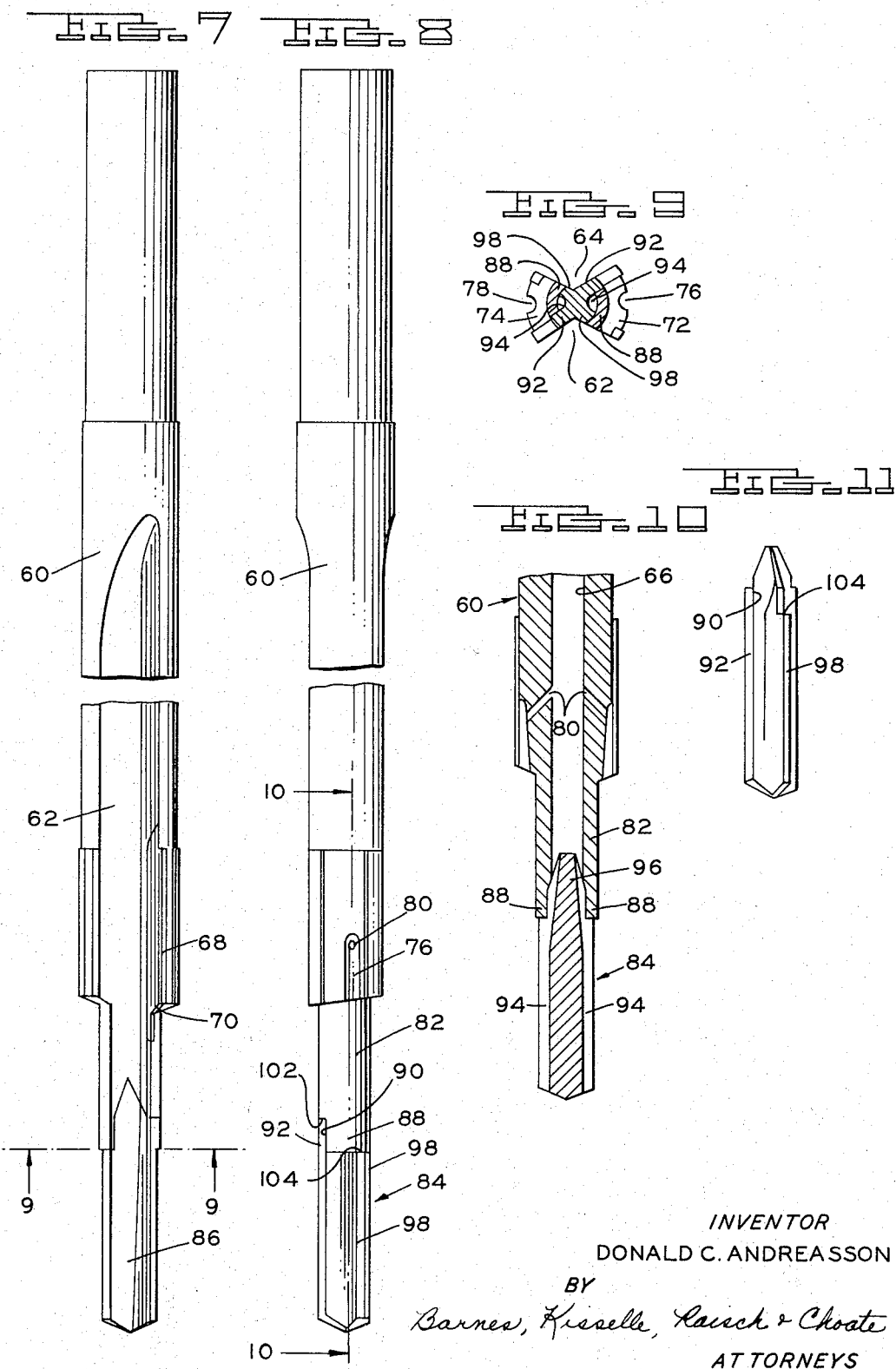

3,359,837
ROTARY TOOL CONSTRUCTION
Donald C. Andreasson, Birmingham, Mich., assignor to
Detroit Reamer & Tool Company, Birmingham, Mich.,
a corporation of Michigan
Filed Jan. 26, 1965, Ser. No. 428,164
2 Claims. (Cl. 77—68)

ABSTRACT OF THE DISCLOSURE

This invention relates to an improved drill and reamer construction utilizing a positive interlock drive between a hard cutting end of a drill and a driving shank and utilizing also the structure of the direction drive to accomplish a coolant flow control wherein coolant is directed downwardly along coolant channels in the cutting bit to reach the cutting surfaces at the end of the drill even in the absence of guiding bushings. The improvement is characterized by widening the mechanical interlock skirt and narrowing a particular land so that greater shear strength is provided.

---

This invention relates to improvements in a rotary tool construction and more particularly to an improved joint between a coolant carrying shank and a cutting insert secured to the shank.

Reference is made to co-pending application Ser. No. 206,972, filed July 2, 1962, now issued Patent No. 3,169,-417, dated Feb. 16, 1965, wherein a related structure is shown.

In previous structures, it has been disclosed to utilize an interlock joint between a shank and a drill or reamer bit with certain interfitting parts which also direct coolant down a flute to present it to the cutting end of the bit. In this connection, the previous structures have utilized interrupted skirt construction in the shank, the various portions of the skirt interfitting with flutes in the bit insert to create a torque drive and also to direct coolant axially of the cutting bit.

The present invention contemplates an improvement on the previous structure particularly adaptable to small bits and reamers, especially those tools wherein there is provided an escape flute for chips when the tool is used in a blind hole. In general, the object of the invention is to provide a construction wherein the skirt can have a wider circumferential scope to strengthen it and also to present better contact with the bit insert to be brazed thereto to improve the junction between the parts.

It is a further object to provide a construction which is more economical to manufacture and one which by its design eliminates certain strains on some types of carbide inserts which are used as the bit or cutting portion of the combination.

Other objects and features of the invention relating to details of construction and operation will be apparent in the following description and claims.

Drawings accompany the disclosure and the various views thereof may be briefly described as:

FIGURE 1, an elevation of a drill showing the assembled parts constructed in accordance with the present invention.

FIGURE 2, a view similar to FIGURE 1 showing the parts in separated position.

FIGURE 3, a slightly rotated view of the parts to illustrate the joint between the parts.

FIGURE 4, a view of the drill insert rotated to the position shown in FIGURE 3.

FIGURE 5, a sectional view on line 5—5 of FIGURE 1.

FIGURE 6, a longitudinal sectional view of the bit insert with a straight coolant web.

FIGURE 7, a view of a modified structure illustrating a double diameter combination drill-reamer utilizing the invention.

FIGURE 8, a view similar to FIGURE 7 showing the parts rotated slightly.

FIGURE 9, a sectional view on line 9—9 of FIGURE 7.

FIGURE 10, a sectional view on line 10—10 of FIGURE 8.

FIGURE 11, a view of the bit insert rotated to the position shown in FIGURE 8.

Referring to FIGURE 1, a two flute drill is shown comprising a shank portion 20 having a central coolant passage 22 and a bit 24 having flutes that match those of the shank. The double flutes 26 and 28 are shown in the sectional view in FIGURE 5. The bit end of the shank is provided with a recess 30 (FIGURE 2) which is enlarged over the normal diameter of the coolant passage 12 to receive a shaped end 32 of the bit 24. The walls of the recess 30 which form a skirt around this recess are notched to provide diametrically opposed gaps in the skirt which leave the remaining skirt tabs 34 and 36. The sectional view of the bit insert 24 in FIGURE 5 illustrates that there are actually four lands on the bit, two of which are shown at 38 and 40, and two of which are shown at 42 and 44.

The two lands 42 and 44 have been reduced in cross-section at the shank end to provide recesses to receive one edge of the skirts 34 and 36. The other edge of the skirts abut against a radial surface 46 and 48 respectively to provide a driving connection to transmit torque between the shank and the drill bit insert. Coolant flutes 50 and 52 are provided in the lands of the flutes between flutes 26 and 28 and the portion of the flutes 42 and 44 across coolant flutes 50 and 52 are cut away to receive the trailing edge of the skirts 34 and 36, and the lands 38 and 40 are leading lands relative to the direction of rotation while the lands 42 and 44 are trailing lands.

In the assembly shown in FIGURE 3, the coolant groove 50 is shown between the lands 38 and 42 and the relationship of the skirt 36 is shown having one edge abutting against the radial surface 46 and the other edge overlying the recessed or notched portion 54 of the land 42 and bridging the coolant groove 50 so that coolant will be directed down the groove 50 which extends upwardly into the recess 30 so that it may receive coolant from the central passage 22. The structure on the opposite side of the insert is symmetrical.

In FIGURE 6, the assembly is shown in longitudinal section with the web of the drill bit insert 24 straight to facilitate the presentation. When the parts are assembled, they are brazed together in a conventional way so that all of the engaging surfaces are bonded while the parts are in alignment. This includes the surfaces 32 engaging the walls of the recess 30, the edge of the skirts 34 and 36 engaging the radial surfaces 46 and 48, and the inner walls of the skirts 34 and 36 engaging the outer reduced diameter of the lands 42 and 44.

In FIGURES 7 to 11, a modified structure is shown illustrating the manner in which the invention may be applied to a multiple diameter combination drill-reamer or deep-hole drill. In this structure, the shank 60 has opposed flutes 62 and 64 for permitting discharge of chips as a result of coolant flowing through the shank in a central passage 66. The large diameter has cutting edges 68 and 70 and in the lands 72 and 74 between the flutes 62 and 64 are small surface grooves 76 and 78 which connect to the central passage 66 by drilled coolant outlet holes 80. The shank is extended into an integral portion 82 which has on the end of it a bit insert 84, this bit insert also having flutes 86 which blend with the flutes 62–64 of the larger diameter section. The ends of the shank extension 82 terminate in diametrically spaced skirts 88 each of which abuts against a radial surface 90 of a land 92.

These skirts 88 bridge over coolant outlet channels 94, these channels extending upwardly into a recessed end of portion 82 which receives a shaped portion 96 of the insert 84. Between the diametrically opposed lands 92 is another pair of diametrically opposed lands 98 which are reduced in cross-section to permit the overlap of the skirts 88 (see FIGURES 9 and 11). Thus, again the torque drive is obtained for the bit insert 84 through the engagement of the skirt portion 88 with the land 92 and the parts are brazed together as described in connection with the previous embodiment of FIGURES 1 to 6.

It will thus be seen that all of the advantages of the skirt drive can be obtained in very small diameters of tools, such as ¼" and under and also the advantages of the axial coolant flow can be obtained by reason of the direction given the coolant passing down through the surface grooves 94 receiving directions from skirts 88. For small diameter tools, there is thus more strength in the driving skirt since it has a greater circumferential dimension and the cost of manufacture is less because accurate forming of the skirt to have it inserted between lands is avoided. Also, cracking of the insert is avoided which otherwise might result from the expansion of the skirt between tight fitting lands of the previous construction. The brazing surface is improved because of the radial and circumferential contact presented by the contacting lands making it possible to have better alignment and more resistance to bending stresses in small drills.

It will be noted that in each embodiment shown in the drawings the shank flute is notched to have an axial engagement with the driving land of the bit. In FIGURE 2, this notch creates the shoulder 100 adjacent the driving skirt 34 and in FIGURE 8 this shoulder is found at 102. At the same time, the land which is reduced in cross-section presents a shoulder for axial engagement with the flute of the shank. This occurs at 103 in FIGURE 3 and 104 in FIGURE 8. Thus, the shank can transmit the axial pressures involved in drilling or reaming directly to the lands of the insert through these contact points which assist in the stability of the parts relative to alignment and which also provide additional brazing surface contact.

The invention is particularly useful in rotary tools wherein flutes are provided for the escapement of chips and the one or more lands of the tool are provided with coolant carrying axial flutes to furnish coolant to the walls of the hole and also to the end of the cutting insert.

I claim:
1. In a coolant carrying rotary tool of the type using a driving shank having an axial coolant passage therein and a co-axial bit on the working end thereof,
    (a) an elongate bit having a flute and land configuration in cross-section between a cutting end and a shank end having a reduced radius over its entire leading land and a trailing land on respective sides of a coolant flute, a portion of the trailing land at the shank end having a reduced radius over its entire circumferential dimension,
    (b) a driving shank having an axially extending coolant passage and a recess at the bit end to telescopically receive a portion of the shank end of said bit, said shank having an extending skirt portion forming a portion of a wall of said recess and circumferentially dimensioned to overlie a portion of a flute at the shank end of said bit with one edge of said skirt in abutting engagement with a wall of said coolant flute at the leading land and the other edge of said skirt completely overlying and engaging the trailing land at said reduced radius, and
    (c) means bonding said skirt to said bit at said engaging portions whereby said coolant passage of said shank is open to said recess and said coolant flute inside said skirt.

2. In a coolant carrying rotary tool of the type using a driving shank having an axial coolant passage therein and a co-axial bit on the working end thereof,
    (a) an elongate bit having a flute and land configuration in cross-section between a cutting end and a shank end, there being a circumferentially spaced leading land and a trailing land on respective sides of a coolant flute, the leading land terminating at a shoulder at the shank end of the bit, the trailing land having a reduced radius over its entire circumferential dimension terminating at a shoulder surface spaced from the shank end of said bit,
    (b) a driving shank having an axially extending coolant passage and a recess at the bit end to telescopically receive a portion of the shank end of said bit, said shank being formed with an alternate flute and land configuration, the land of said shank terminating as a skirt portion forming a portion of the wall of said recess, said skirt having a notch at a leading edge terminating at a shoulder surface,
        whereby said bit and shank interengage, the shoulder surface of said notch engaging the end of said leading land on said bit, the leading edge of said skirt at said notch abutting a wall of said coolant flute of said bit at the leading land, the trailing edge of said skirt completely overlying and engaging the trailing land of said bit at said reduced radius and a portion of the end of said skirt at the trailing land of said bit abutting and engaging the shoulder surface of the trailing land of said bit, the remainder of said skirt overlying the flute of said bit to form a coolant passage open to said recess and the coolant passage of said shank, and
    (c) means bonding said skirt and said bit at said engaging surfaces.

References Cited

UNITED STATES PATENTS 3,216,107  11/1965  Andreasson _____ 77—68 X

FRANCIS S. HUSAR, *Primary Examiner.*